(12) United States Patent
Winkler et al.

(10) Patent No.: US 12,324,382 B2
(45) Date of Patent: Jun. 10, 2025

(54) SCALABLE INTEGRAL TURNTABLE AND TRELLIS

(71) Applicant: Shoptech Machining & Prototype LLC, Adrian, MI (US)

(72) Inventors: Scott Christopher Winkler, Adrian, MI (US); Jacob Scott Winkler, Adrian, MI (US); Andrew Donald Winkler, Adrian, MI (US)

(73) Assignee: Shoptech Machining & Prototype LLC, Adrian, MI (US)

( * ) Notice: Subject to any disclaimer, the term of this patent is extended or adjusted under 35 U.S.C. 154(b) by 0 days.

(21) Appl. No.: 18/373,374

(22) Filed: Sep. 27, 2023

(65) Prior Publication Data

US 2025/0098598 A1    Mar. 27, 2025

(51) Int. Cl.
| | | |
|---|---|---|
| *A01G 9/12* | (2006.01) | |
| *A01G 9/02* | (2018.01) | |
| *A01G 9/04* | (2006.01) | |

(52) U.S. Cl.
CPC ............... *A01G 9/12* (2013.01); *A01G 9/022* (2013.01)

(58) Field of Classification Search
CPC ...... A01G 9/12; A01G 9/04; A47G 2007/048; A47B 11/00
See application file for complete search history.

(56) References Cited

U.S. PATENT DOCUMENTS

| | | | |
|---|---|---|---|
| 1,336,307 A * | 4/1920 | Loudon ................. | A47G 7/041 248/140 |
| 8,857,103 B1 * | 10/2014 | Coon ..................... | A01G 9/124 47/79 |
| 10,966,550 B2 * | 4/2021 | Maddocks ............. | A01G 9/02 |
| 2012/0000124 A1 * | 1/2012 | Posa ...................... | A01G 9/12 47/45 |
| 2022/0369570 A1 * | 11/2022 | Lord ...................... | A01G 9/12 |
| 2022/0408659 A1 * | 12/2022 | Massay ................. | A01G 9/247 |

FOREIGN PATENT DOCUMENTS

| | | | | |
|---|---|---|---|---|
| WO | WO-2004014200 A1 * | 2/2004 | ............. | A01G 9/12 |
| WO | WO-2007004879 A2 * | 1/2007 | ............. | A01G 9/12 |

* cited by examiner

*Primary Examiner* — Kristen C Hayes
(74) *Attorney, Agent, or Firm* — Thomas Heed; Heed Law Group

(57) ABSTRACT

The scalable integral turntable and trellis is comprised of a turntable, a planter base, a first u-shaped trellis base, a second u-shaped trellis base, a first plurality of trellis connectors, and first plurality of trellis extensions. The scalable integral turntable and trellis is constructed so that the trellis arms and planter base rotate in unison with the rotational surface of the turntable.

14 Claims, 11 Drawing Sheets

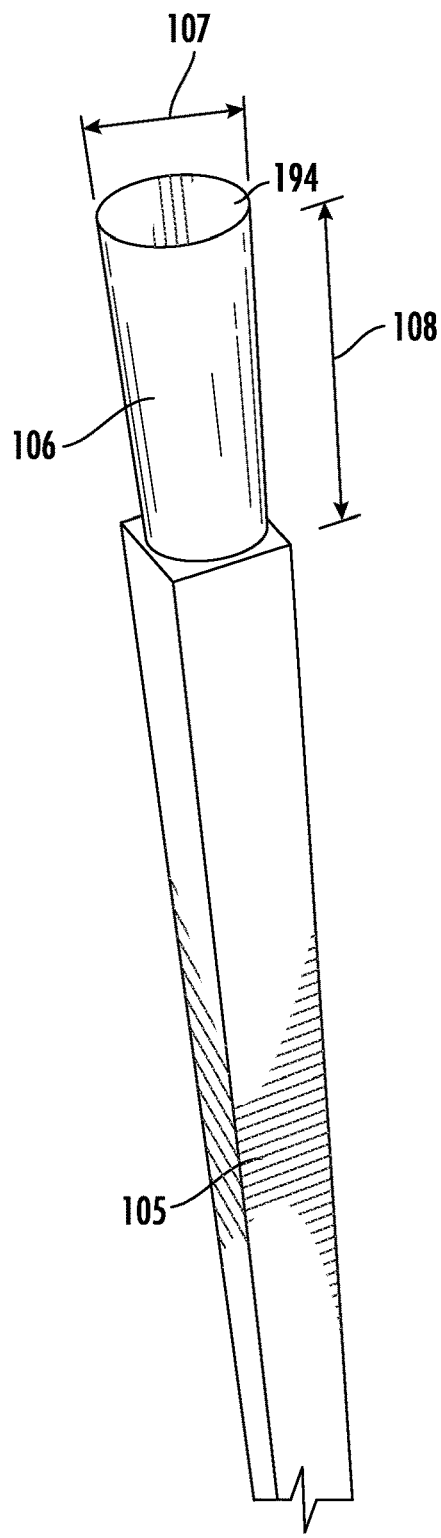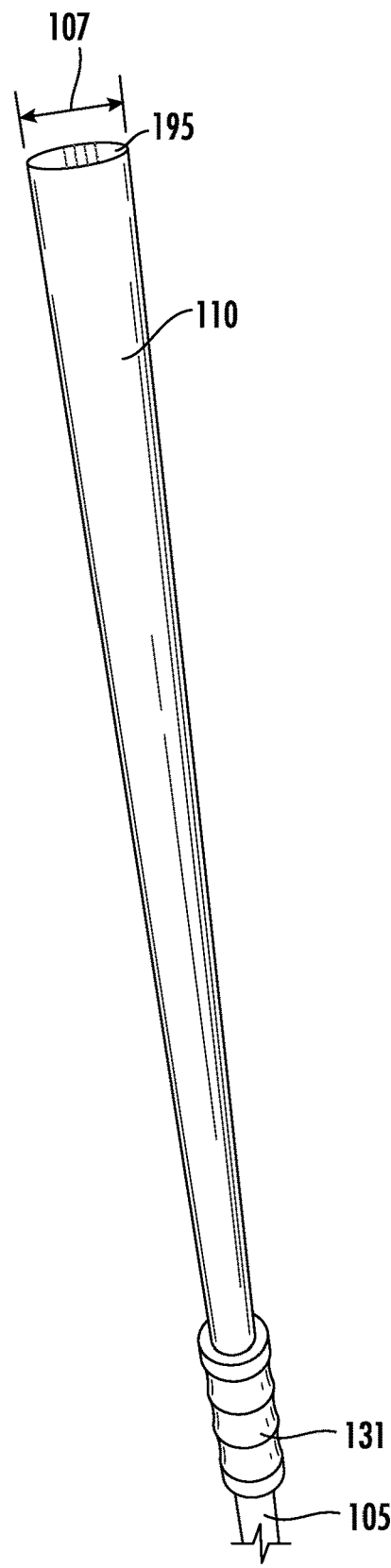
FIG. 10A
FIG. 10B

SCALABLE INTEGRAL TURNTABLE AND TRELLIS

FIELD OF INVENTION

This invention relates to the classification of horticulture; and to one or more sub-classifications under cultivation in receptacles, forcing-frames or greenhouses. Specifically, this invention is a scalable integral turntable and trellis.

BACKGROUND OF INVENTION

Industrial-scale indoor horticulture has been booming for the last decade. This boom is driven partly by the desire to farm fresh fruits and vegetables in an urban environment, closer to the consumer. This boom is also partly driven by the legalization of marijuana.

Indoor agricultural production has limitations not faced by traditional agriculture. Indoor agriculture typically limits the size of each plant, attempting to fit as many plants as possible into a given amount of space. Due to space limitations, indoor agriculture can often limit access to the plants being grown. Indoor agriculture also wants uniformity and predictability.

It is common to use both trellises and turntables in indoor horticulture. Trellises are used to both support plants and to provide guidelines for trimming plants while they grown, in order to achieve uniform plants. The problem arises that the plant, sitting on the turntable, is limited in how far it can turn because of the plant being bound to the trellis or being blocked from free rotation by the trellis.

The indoor agriculture technology market needs a scalable integral turntable and trellis system, in which the trellis spins with the turntable, in order to lower the cost of set-up, increase the percentage of space that can be used to grow plants, allow access to all sides of a plant, and expose different sides of a plant to light.

SUMMARY OF THE INVENTION

This summary is intended to disclose the present invention, a scalable integral turntable and trellis. The embodiments and descriptions are used to illustrate the invention and its utility, and are not intended to limit the invention or its use.

The scalable integral turntable and trellis is comprised of a turntable, a planter base, a first u-shaped trellis base, a second u-shaped trellis base, a first plurality of trellis connectors, and at least a second plurality of trellis extensions. The first u-shaped trellis base is at a right angle to the second u-shaped trellis base. The u-shaped trellis bases are fabricated from rigid structural materials, including, but not limited to, square aluminum rod, round aluminum rod, square steel rod, square steel tubing, round steel rod, round steel tubing, structural polymers, and wood. Due to strength to weight ratios and overall weight, square aluminum rods and round aluminum rods work best. In the preferred embodiment, a piece of straight aluminum is bent in two locations with 90 degree filleted bends. This creates three distinct straight segments: a horizontal segment, and two vertical segments. The vertical segments are the same height. The u-shaped trellis base has a plurality of holes. The pair of u-shaped trellis bases are fastened together by placing a threaded fastener or similar fastening technology through a center hole on the horizontal segment of each of the first and second u-shaped trellis bases.

The scalable integral turntable and trellis can be heightened by adding a third plurality of trellis connectors and a fourth plurality of trellis extensions. Additional trellis extensions can be added to further heighten the trellis arms. The number of trellis connectors always equals the number of trellis extensions.

A trellis arm is comprised of the vertical portion of the u-shaped trellis bases all of trellis connectors and all trellis extensions. The shape of the trellis connectors has to match the shape of the ends of the u-shaped trellis bases and the trellis extensions. For example, square trellis connectors can be used with square trellis extensions when the vertical termination of the u-shaped trellis base is square. The vertical termination of the u-shaped trellis base can be turned to be a cylinder. In this example, trellis connectors with a round opening and a cylindrical inner surface would be used with cylindrical trellis extensions.

The turntable acts as a base for the invention. The two u-shaped trellis bases are joined to the turntable. The planter base is mounted on the horizontal portions of the trellis bases. The present invention allows the trellis arms and planter base to spin at the same rate as the turntable. This allows for easier plant maintenance, as the plant can be rotated without interference from the trellises.

BRIEF DESCRIPTION OF THE DRAWINGS

The present invention, a scalable integral turntable and trellis, is illustrated with 10 drawings on 11 sheets.

FIG. 10A is a perspective isolation of the end of a u-shaped trellis base in which the vertical termination has been turned to be cylindrical. FIG. 10B is a perspective isolation of a cylindrical trellis extention.

DETAILED DESCRIPTION OF THE DRAWINGS

Figure 1:
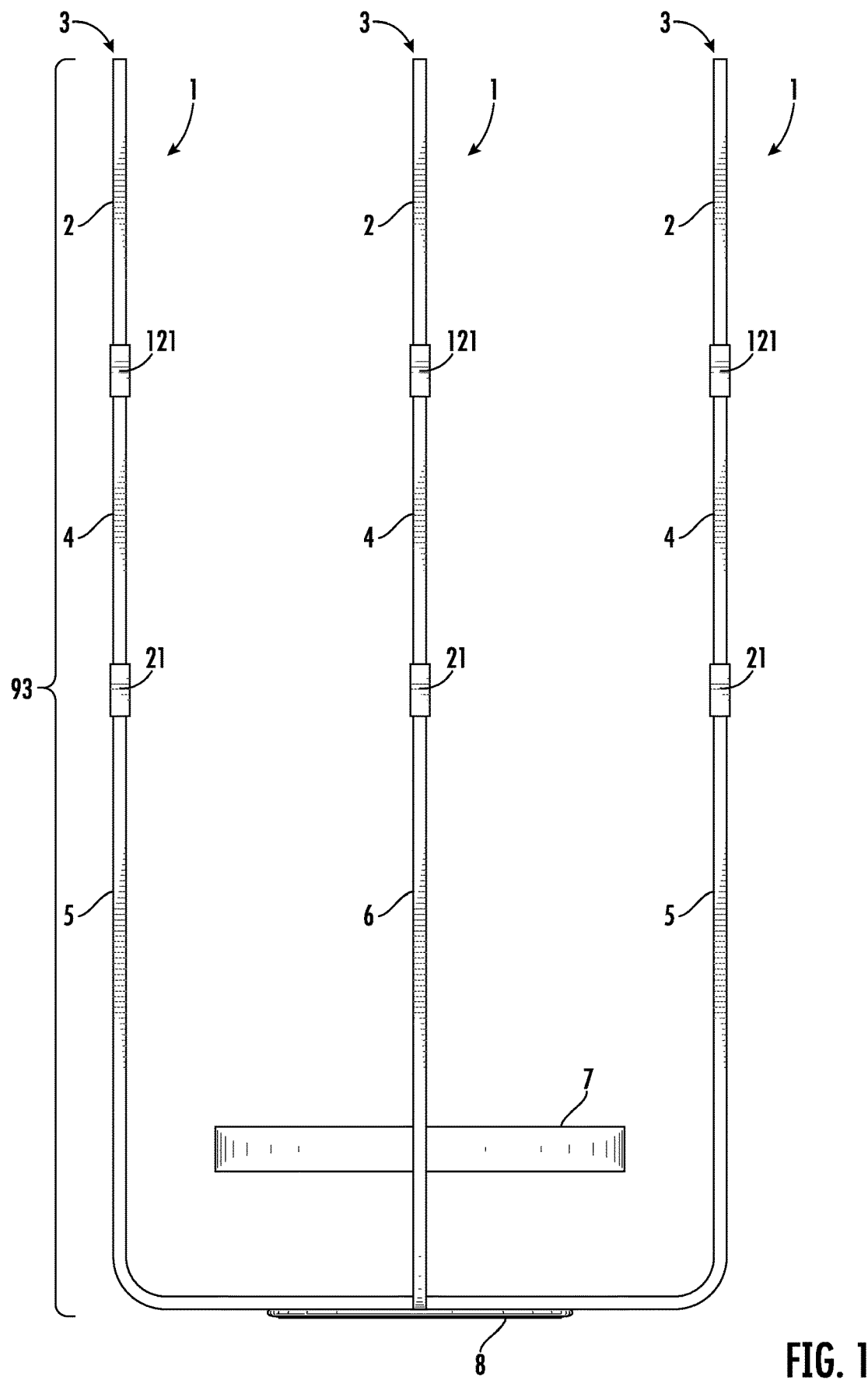
FIG. 1 is a lateral view of the present invention, a scalable integral turntable and trellis.

The following descriptions are not meant to limit the invention, but rather to add to the summary of invention, and illustrate the present invention, by offering and illustrating various embodiments of the present invention, a scalable integral turntable and trellis. While embodiments of the invention are illustrated and described, the embodiments herein do not represent all possible forms of the invention. Rather, the descriptions, illustrations, and embodiments are intended to teach and inform one skilled in the art without limiting the scope of the invention.

Certain terminology is used in the following description for convenience only and is not limiting. The article "a" is intended to include one or more items, and where only one item is intended the term "one" or similar language is used. To assist in the description of the present invention, words such as before, after, first, second, near, far, short, long, top, bottom, side, upper, lower, front, rear, inner, outer, right and left are used to describe the relative sequence, order, proximity, size and orientation of aspects of the present invention, a scalable integral turntable and trellis. The terminology includes the words above specifically mentioned, derivatives thereof, and words of similar import.

FIGS. 1-5 show the present invention, a scalable integral turntable and trellis 1. The scalable integral turntable and trellis is comprised of a turntable 8, a planter base 7, a first u-shaped trellis base 5, a second u-shaped trellis base 6, a first plurality of trellis connectors 21, and at least a second plurality of trellis extensions 4. The scalable integral turntable and trellis 1 can be heightened by adding a third plurality of trellis connectors 121 and a fourth plurality of trellis extensions 2. The number of trellis connectors 21, 121 always equals the number of trellis extensions 4, 2. In other words, the first plurality of trellis connectors 21, and the second plurality of trellis extensions 4 are equal in number. Likewise, the third plurality of trellis connectors 121 and the fourth plurality of trellis extensions 2 are equal in number.

Additional trellis extensions 4, 2 can be added to further heighten the trellis arms 93. All trellis extensions 4, 2 are fabricated from rigid structural materials, including, but not limited to square aluminum rod, round aluminum rod, square steel rod, square steel tubing, round steel rod, round steel tubing, structural polymers, and wood. In the preferred embodiments illustrated herein, square aluminum rod and round aluminum rod are used. The weight of the square aluminum rods is beneficial to smooth rotation of the present invention 1. A trellis arm 93 is comprised of the vertical portion (see FIG. 7, 51, 53) of the u-shaped trellis bases 5, 6, all of trellis connectors 21, 121 and all trellis extensions 4, 2. There is a free end 3 or terminal end 3 to the top-most trellis extensions 2 of each trellis arm 93.

Figure 2:
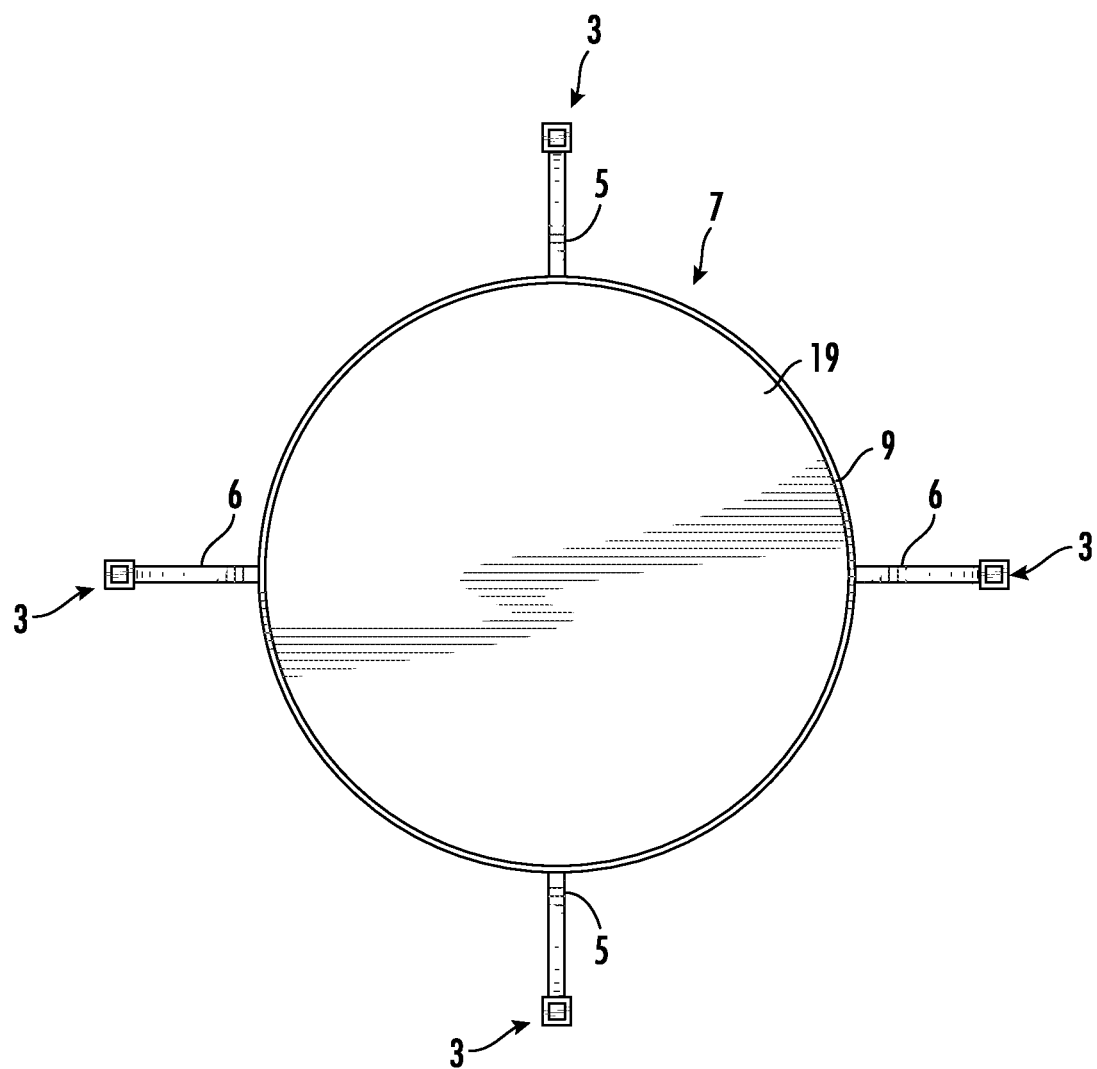
FIG. 2 is a top view of the present invention, a scalable integral turntable and trellis.

FIG. 2 is a top view of the present invention, showing the rim 9 and inner bottom surface 19 of the planter base 7 and the terminal ends 3 of the trellis arms 93. A portion of the u-shaped trellis bases 5, 6 is also visible in FIG. 2.

Figure 3:
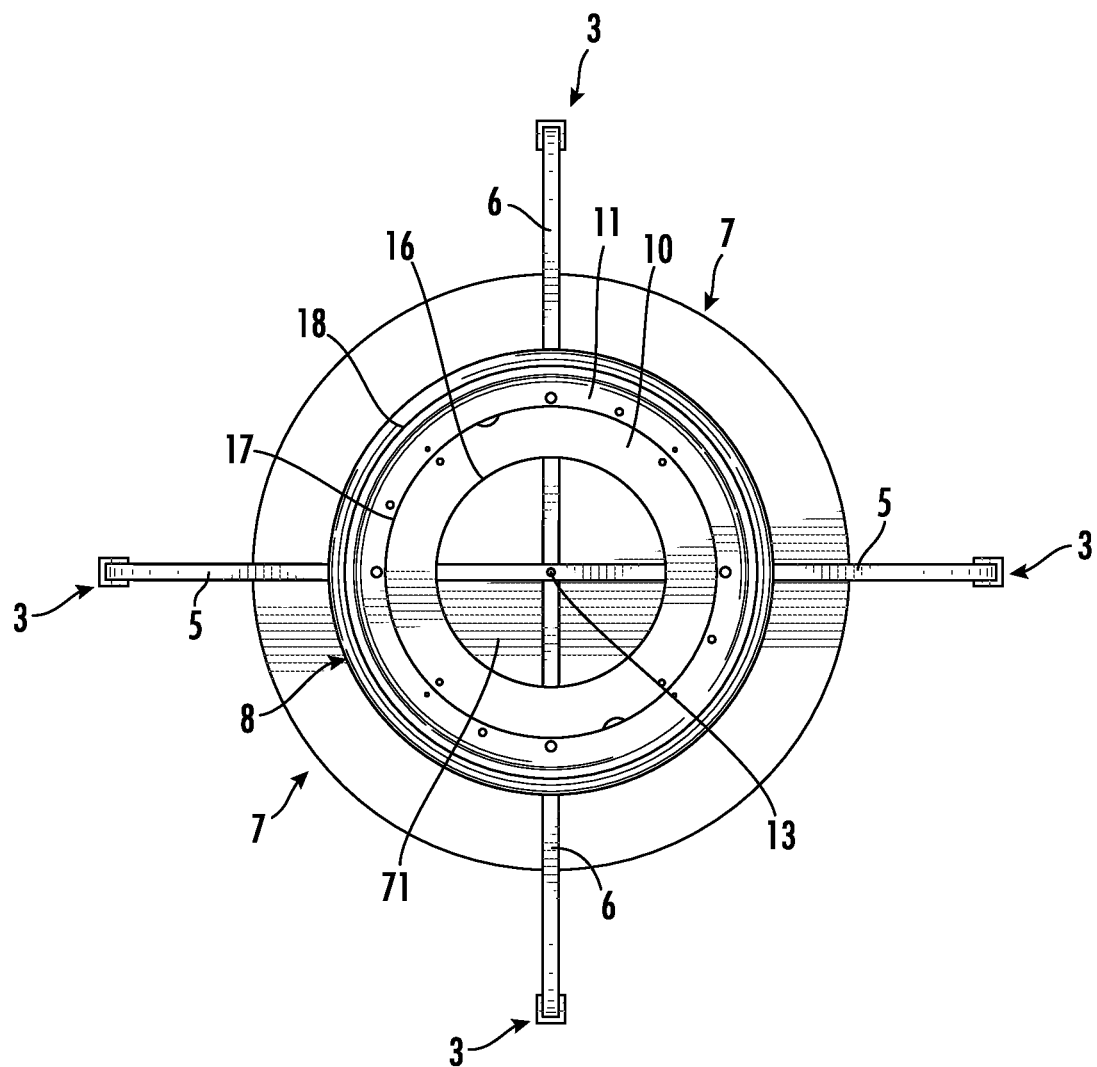
FIG. 3 is a bottom view of the present invention, a scalable integral turntable and trellis.

FIG. 3 shows the bottom view of the present invention. The terminal end 3 of the trellis arm 93 is visible around the periphery. The trellis arms 93 extend from the u-shaped trellis bases 5, 6. The u-shaped trellis bases 5, 6 are joined 13 at a right angle at their junction 13. The outer bottom surface 71 of the planter base 7 is positioned above, and is in proximity to, the turntable 8.

The turntable 8 has a lower bearing housing 18 upon which the invention 1 rests. There is a stationary flange 11 which terminates at an inner diameter 17. The stationary flange 11 and lower bearing housing 18 are the stationary base 11, 18 of the turntable 8. The turntable 8 rests on its stationary base 11, 18. There is a rotational annulus 10 with an inner diameter 16. Although in this embodiment, the turntable 8 has a rotational annulus 10, the rotational surface can also be round or any other planar shape.

Figure 4:
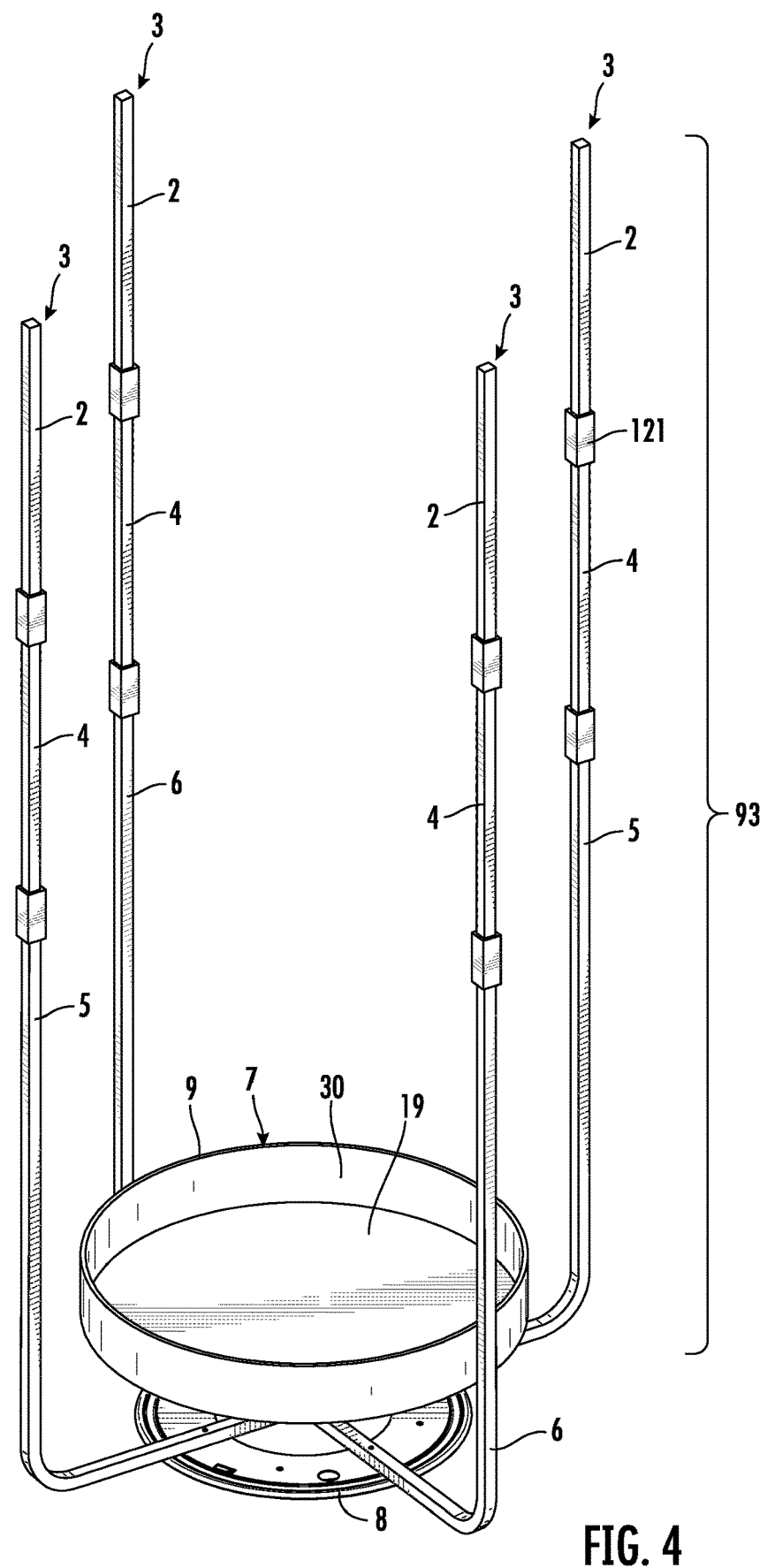
FIG. 4 is a perspective view of the present invention, a scalable integral turntable and trellis.

FIG. 4 is a perspective view of the present invention, showing, among other things, the two u-shaped bases 5, 6; the second plurality of trellis extensions 4; the fourth plurality of trellis extensions 2; representative trellis connectors 21, 121; the terminal end 3 of the trellis arms 93; and the planter base 7. The rim 9, inner bottom surface 19 and inner side surface 30 of the planter base 7 are visible in this view. The planter base 7 is within the trellis arms 93 and is affixed to the u-shaped bases 5, 6. The planter base 7 moves with the trellis arms 93 when the turntable 8 is turned.

Figure 5:
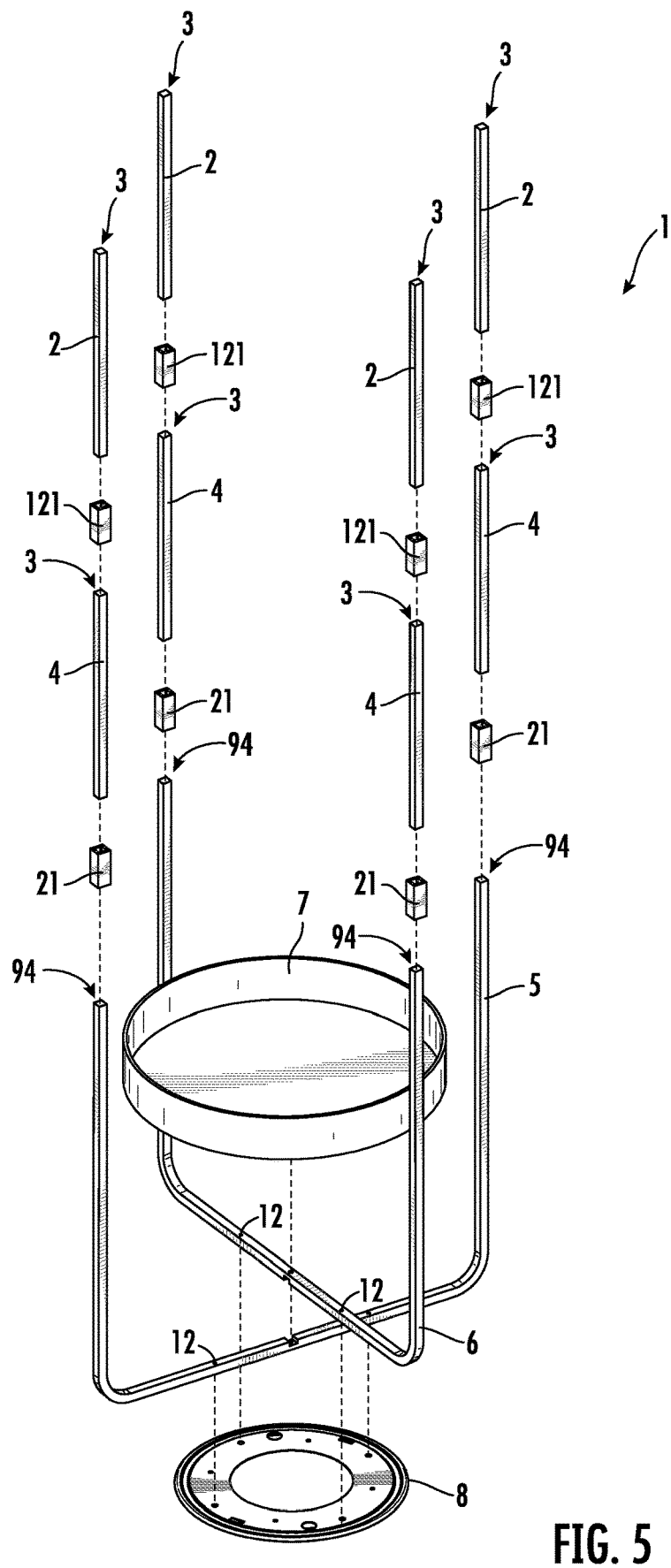
FIG. 5 is an exploded view of the present invention, a scalable integral turntable and trellis.

FIG. 5 is an exploded view of the present invention 1, showing, among other things, the two u-shaped bases 5, 6; the second plurality of trellis extensions 4; the fourth plurality of trellis extensions 6; a first plurality of trellis connectors 21; and a third plurality of trellis connectors 121. The first u-shaped trellis base 5 and the second u-shaped trellis base 6 are durably attached to the turntable 8 using a plurality of threaded fasteners 12 or similar fastening technology.

In this embodiment, the first plurality of trellis connectors 21 and the third plurality of trellis connectors 121 are square, as is the terminal end 94 of the u-shaped base 5, 6 and the terminal end 3 of the second plurality and fourth plurality of trellis extensions 2, 4.

Figure 6:
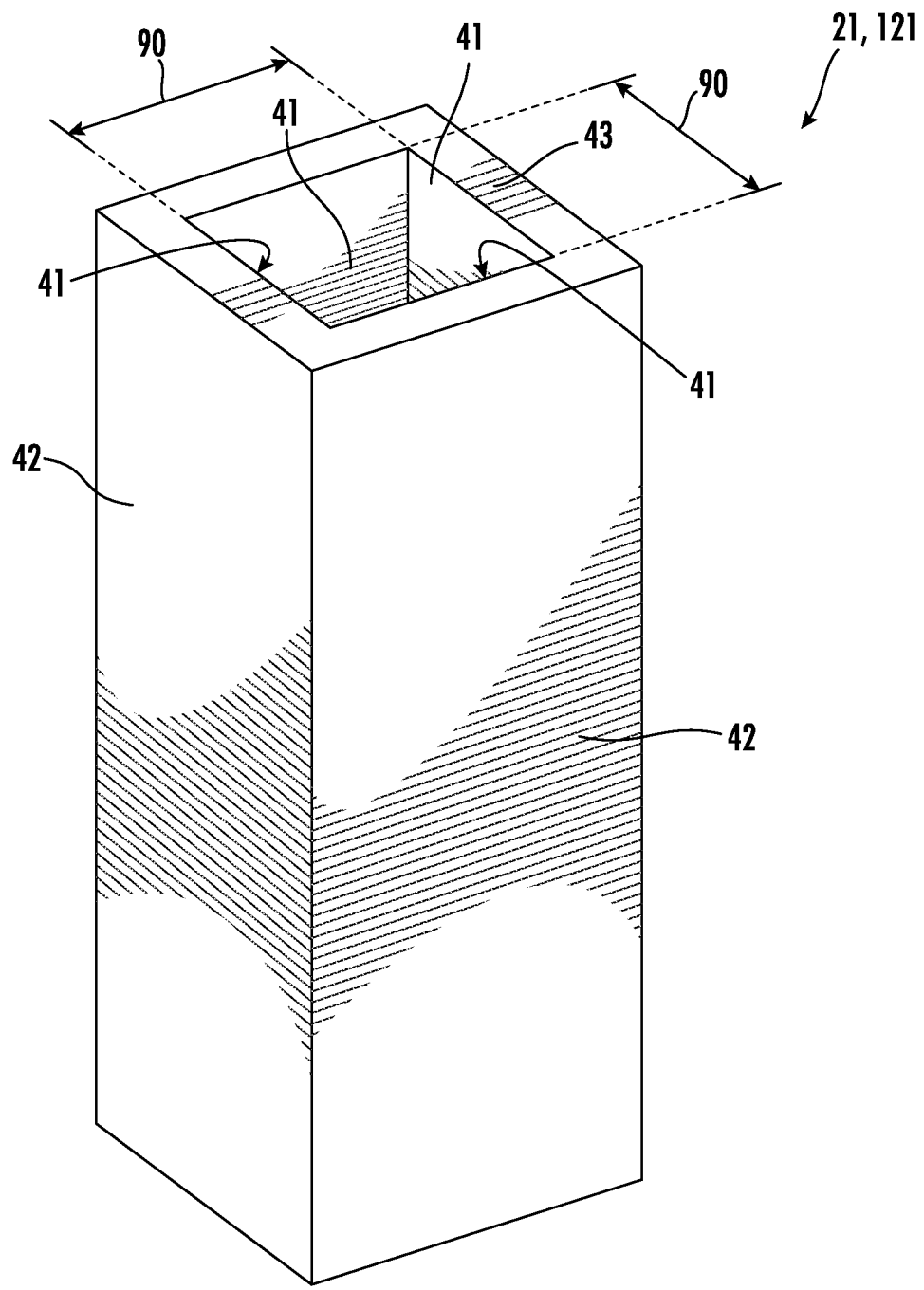
FIG. 6 is a perspective view of a trellis connector.

FIG. 6 shows a representative square trellis connector 21, 121. The square trellis connector 21, 121 has a square interior surface, wherein there are four interior surfaces 41 all of which have the same width 90. The square trellis connector 21, 121 has four rectangular exterior side surfaces 42. The square interior surface 41 goes all the way through the trellis connector 21, 121. In other words, the trellis connector 21, 121 is hollow. Only two of the four rectangular exterior side surfaces 42 are visible in this view. The square trellis connector 21, 121 also has a rim.

Figure 7:
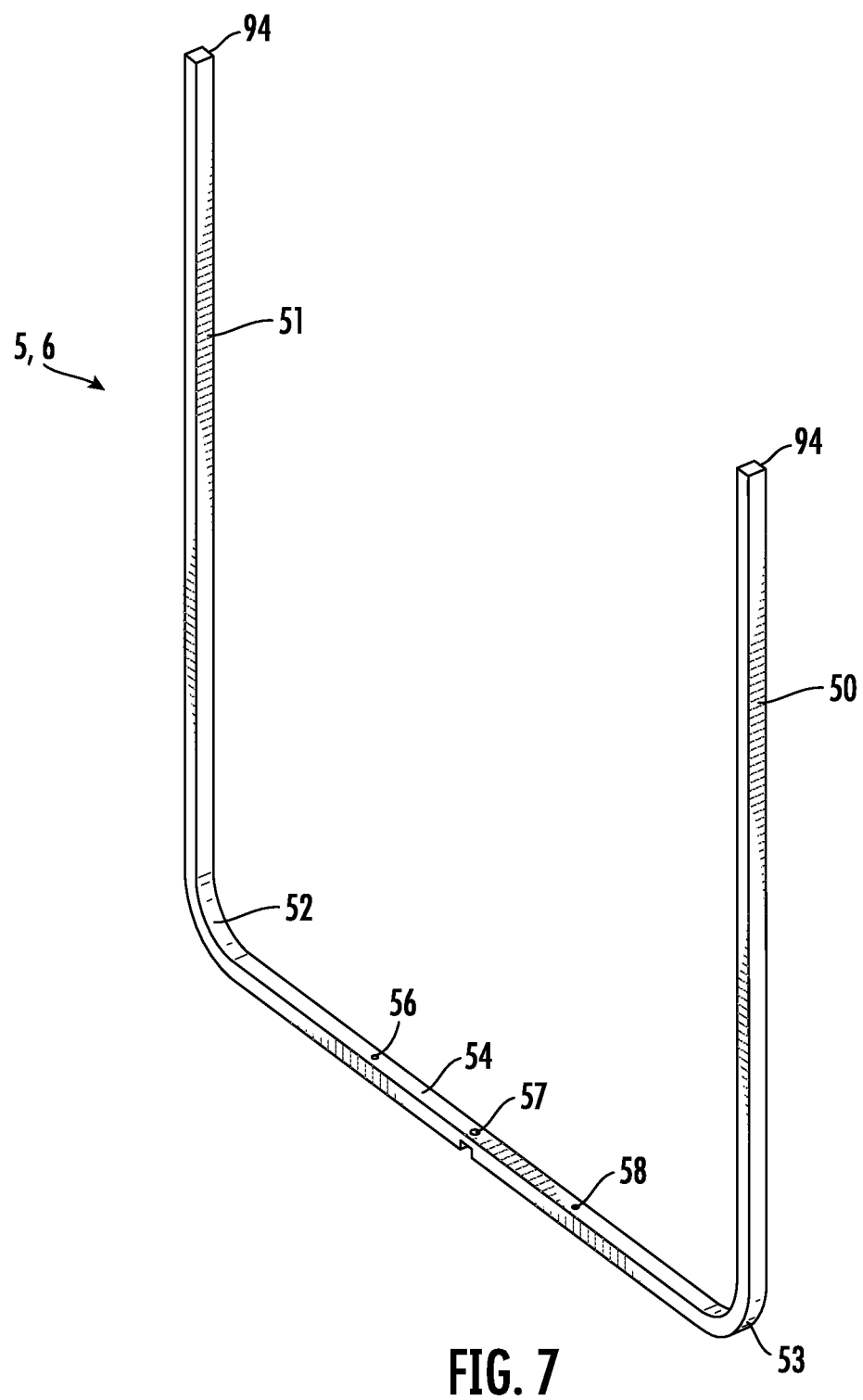
FIG. 7 is perspective view of a u-shaped trellis base.

FIG. 7 shows the u-shaped trellis base 5, 6. The u-shaped trellis bases 5, 6 are fabricated from square aluminum rods. In the preferred embodiment, the alumimum rod is 6061 aluminum that is ½" per side. A section of straight aluminum rod has two 90 degree filleted bends 52, 53. This creates three distinct straight segments: a horizontal segment 54, and two vertical segments 50, 51. The two vertical segments 50, 51 are equal in length as seen in FIG. 7. The two vertical segments 50, 51 have a terminal end 94 upon which a trellis connector 21, 121 can be seated. The u-shaped trellis base 5, 6 has a plurality of holes 56, 57, 58. As shown in FIG. 5, a threaded fastener 12 or other similar fastening technology is put the two outboard holes 56, 57. A pair of u-shaped trellis bases 5, 6 are fastened together by placing a threaded fastener 13 or similar fastening technology (as shown in FIG. 3) through the center hole 57.

Figure 10C:
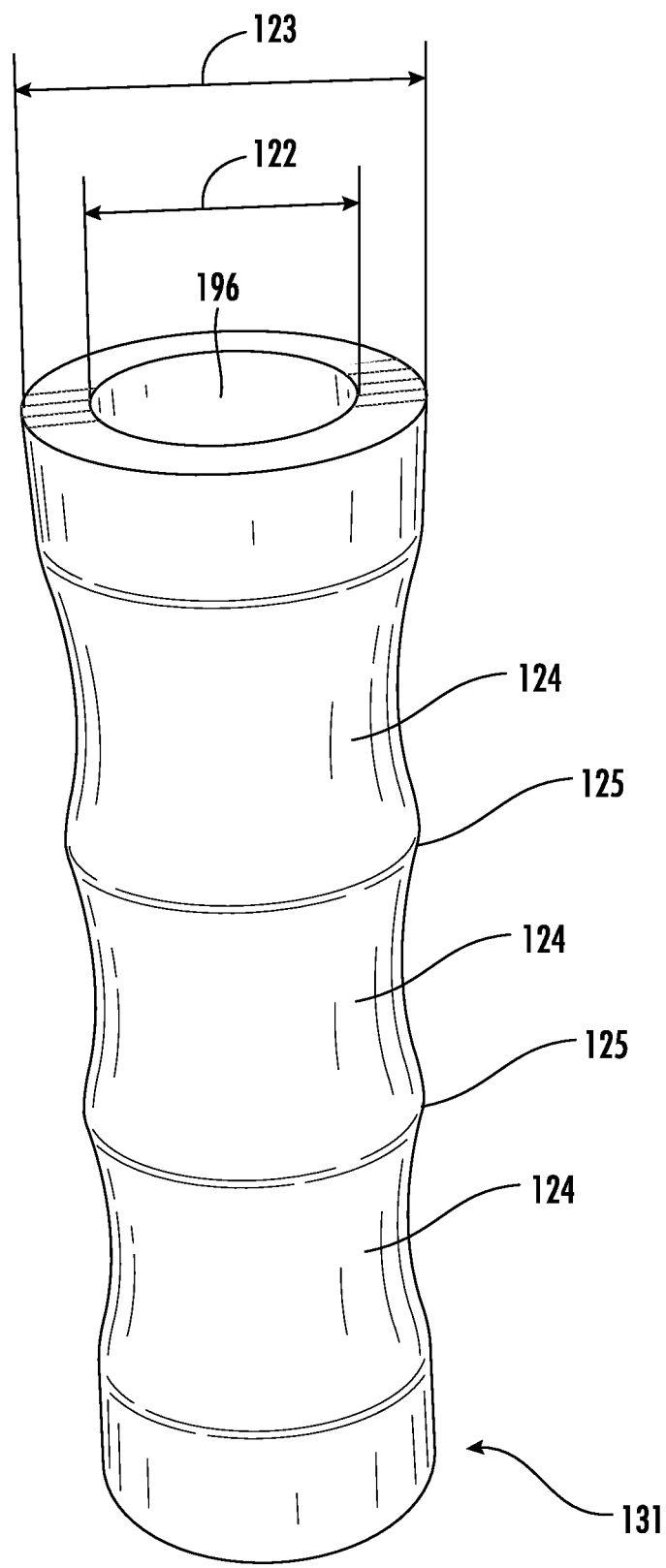
FIG. 10C is a front perspective a trellis connector with a cylindrical inner surface.

FIGS. 10A-10C show an alternate embodiment. In FIG. 10A, each terminal end 194 of the u-shaped base 105 is turned so that it is cylindrical 106. In this embodiment, the u-shaped base 105 is turned at each end prior to the u-shaped base 105 being bent (e.g., 52, 53 in FIG. 7). The cylindrical portion 106 has an effective height 108 and a diameter 107.

FIG. 10B shows a cylindrical trellis extension 110 to mate with the u-shaped base 105 with a cylindrical end 106. The cylindrical trellis extension 110 has a diameter 107 and a terminal end 195 as shown. The inner diameter 107 of the cylindrical trellis extension 110 is equal to the diameter 107 of the u-shaped base 105 with a cylindrical end 106. The cylindrical trellis extension 110 is attached to the u-shaped base 105 with a cylindrical end 106 by a trellis connector 131 that can accommodate a cylinder with a diameter 107.

The trellis connector 131 that can accommodate a cylinder as shown in FIG. 10C. The trellis connector 131 has an inner cylindrical surface 196 with an inner diameter 122. The inner diameter 122 should be equal to, or slightly larger than, diameter 107 of both the cylindrical trellis extension 110 and the u-shaped base 105 with a cylindrical end 106. The trellis connector 131 can accommodate the cylindrical trellis extension 110 and the cylindrical end 106 of the u-shaped base 105. The trellis connector has an outer diameter 123 and a plurality of concave surfaces 124 alternating with ribs 125. The alternating concave surfaces 124 with ribs 125 allows a user to securely grasp the trellis connector 131 and apply force in the necessary direction.

Figure 9:
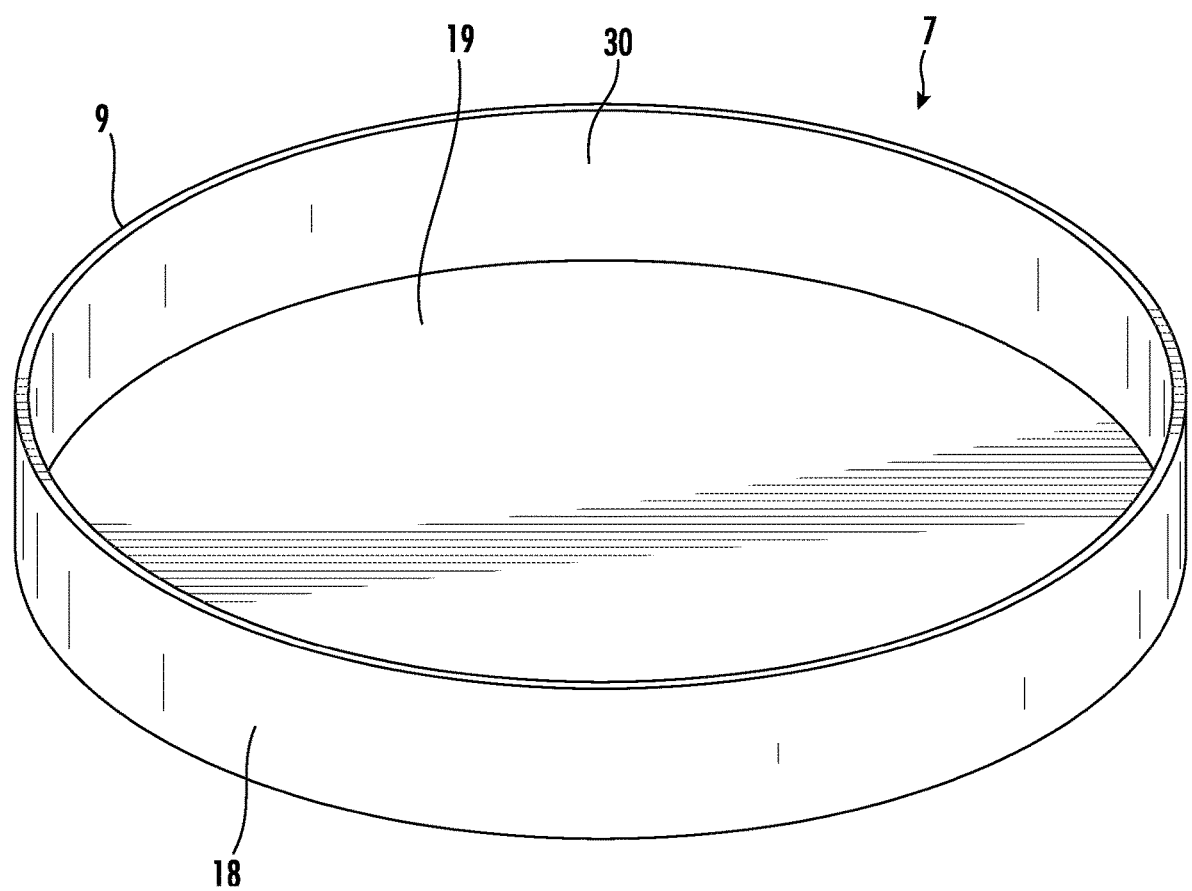
FIG. 9 is a perspective view of a planter base.

FIG. 9 shows the planter base 7 in detail. The planter base 7 has an cylindrical outer side surface 18, a rim 9, a cylindrical inner side surface 30, and an inner bottom surface 19. A plant in a pot (not shown) is placed in the planter base 7 to grow.

Figure 8:
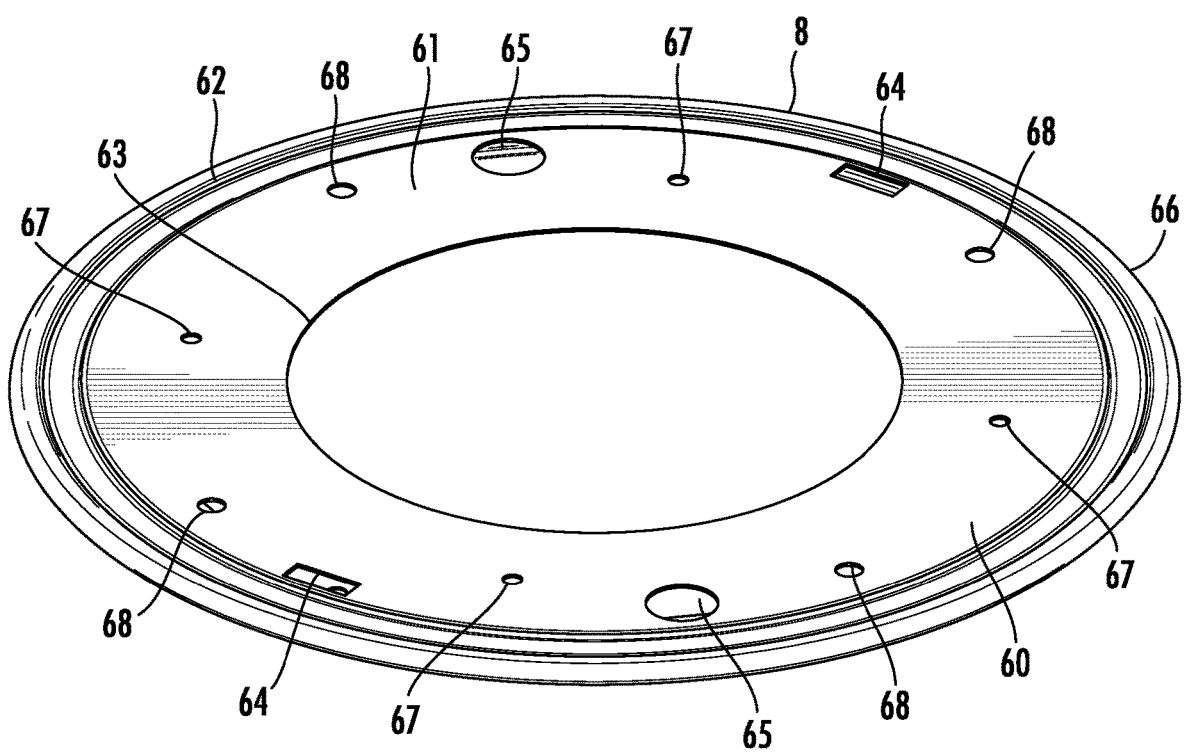
FIG. 8 is a top perspective view of a turntable.

FIG. 8 shows a perspective view of the topside 60 of the turntable 8. The topside 60 of the turntable 8 is a rotational annulus 60. The turntable 8 has a fifth plurality of large holes 65; a sixth plurality of intermediate holes 68, and a seventh plurality of small holes 67. The seventh plurality is usually equal to four. A threaded fastener 12 or other similar fastening technology is put through the two outboard holes 56, 57 of each of the two u-shaped bases 5, 6 into one of the four small holes 67 of the turntable 8 and secured. The turntable 8 has an upper bearing housing 62; an outer diameter 66, an inner diameter 63; and an upper surface 61 of the rotational annulus 60.

The present invention 1 allows the trellis arms 93 and planter base 7 to spin at the same rate as the turntable 8. In other words, u-shaped trellis base 5, 6, 105; the trellis connectors 21, 121, 131; the trellis extensions 2, 4, 105; and the planter base 7 all spin in unison with the rotational surface 10 of the turntable 8. This allows for easier plant maintenance for plants that rely on trellises 93 to properly grow. It also allows for easier plant maintenance for plants that need a trellis or forcing frame to demark the outer limit of the plant's growth space in an indoor agriculture setting.

The u-shaped trellis base 5, 6, 105 is made from sqaure aluminum rod for both the structural integrity given by aluminum rod, and the weight given by aluminum rod. In order to have smooth turntable 8 operation, it is necessary that the whole structure be properly weighted. In the preferred embodiment, the trellis arms 93 should be at a 90-degree angle from the horizontal segment 54 of the u-shaped trellis base 5, 6, 105 in order to insure proper balance when the turntable 8 of the a scalable integral turntable and trellis 1 is spinning.

We claim:

1. A scalable integral turntable and trellis comprised of a turntable having a rotational surface and a stationary base;
   a planter base;
   a first u-shaped trellis base fabricated from a single section of square metal rod with two filleted 90-degree bends, creating two equal vertical segments and a horizontal segment, wherein each vertical segment has a terminal end;
   a second u-shaped trellis base fabricated from a single section of square metal rod with two filleted 90-degree bends, creating two equal vertical segments and a horizontal segment, wherein each vertical segment has a terminal end;
   a first plurality of trellis connectors; and
   a first plurality of trellis extensions;
      wherein the first u-shaped trellis base and the second u-shaped trellis base are affixed to the rotational surface of the turntable so that the horizontal segment of the first u-shaped trellis base is at a right angle to the horizontal segment of the second u-shaped trellis base;
      wherein a trellis connector and a trellis extension are affixed to the terminal end of each vertical segment of both the first and second u-shaped trellis bases; and
      wherein the planter base is positioned on top of, and affixed to, the horizontal segments of the first and second u-shaped trellis bases so that the planter base, u-shaped trellis bases, trellis connectors, and trellis extensions all rotate in unison with the rotational surface of the turntable.

2. The scalable integral turntable and trellis of claim 1 further comprising
   a second plurality of trellis connectors; and
   a second plurality of trellis extensions.

3. The scalable integral turntable and trellis of claim 2, wherein the first plurality of trellis connectors is equal in number to the first plurality of trellis extensions; and the second plurality of trellis connectors is equal in number to the second plurality of trellis extensions.

4. The scalable integral turntable and trellis of claim 1, wherein the single section of square metal rod from which the first u-shaped trellis base is fabricated is a single section of square aluminum rod.

5. The scalable integral turntable and trellis of claim 4, wherein the single section of square metal rod from which the second u-shaped trellis base is fabricated is a single section of square aluminum rod.

6. The scalable integral turntable and trellis of claim 5, wherein the first and second pluralities of trellis extensions are fabricated from square aluminum rod.

7. The scalable integral turntable and trellis of claim 6, wherein the first and second pluralities of trellis connectors are square trellis connectors, having four interior surfaces, all of which have the same width, and wherein the square trellis connectors are sized so as to accommodate the first plurality and the second plurality, respectively, of trellis extensions fabricated from square aluminum rod.

8. The scalable integral turntable and trellis of claim 5, wherein both the first u-shaped trellis base and the second u-shaped trellis base are turned at each of their respective ends to create cylindrical terminal ends.

9. The scalable integral turntable and trellis of claim 8, wherein the first and second plurality of trellis connectors can accommodate a cylinder.

10. The scalable integral turntable and trellis of claim 9, wherein the first and second plurality of trellis extensions are cylinders.

11. The scalable integral turntable and trellis of claim 10, wherein the first plurality and second plurality of trellis extensions are made from cylindrical aluminum rods.

12. The scalable integral turntable and trellis of claim 1, wherein the single section of square metal rod from which the first u-shaped trellis base is fabricated is a single section of square steel rod.

13. The scalable integral turntable and trellis of claim 12, wherein the single section of square metal rod from which the second u-shaped trellis base is fabricated is a single section of square steel rod.

14. The scalable integral turntable and trellis of claim 13, wherein the first and second plurality of trellis extensions are fabricated from square steel rod.

* * * * *